United States Patent
Kikuchi et al.

(10) Patent No.: US 8,691,892 B2
(45) Date of Patent: Apr. 8, 2014

(54) CHAFF MOLDING AND PRODUCTION METHOD THEREOF

(75) Inventors: Kenji Kikuchi, Omihachiman (JP); Mitsuo Shibutani, Osaka (JP); Shusaku Mandai, Osaka (JP)

(73) Assignee: The Nippon Synthetic Chemical Industry Co., Ltd., Osaka (JP)

( * ) Notice: Subject to any disclaimer, the term of this patent is extended or adjusted under 35 U.S.C. 154(b) by 1327 days.

(21) Appl. No.: 12/150,150

(22) Filed: Apr. 25, 2008

(65) Prior Publication Data

US 2008/0280129 A1 Nov. 13, 2008

(30) Foreign Application Priority Data

Apr. 27, 2007 (JP) ................................. 2007-118210

(51) Int. Cl.
- *B32B 5/16* (2006.01)
- *C08K 3/30* (2006.01)
- *C08K 5/00* (2006.01)
- *C08L 29/04* (2006.01)

(52) U.S. Cl.
USPC .............. 524/15; 428/330; 524/423; 524/557

(58) Field of Classification Search
USPC .............................. 428/330; 524/15, 423, 557
See application file for complete search history.

(56) References Cited

U.S. PATENT DOCUMENTS

| 5,308,879 A | * | 5/1994 | Akamatu et al. | ............. 521/84.1 |
| 6,277,899 B1 | * | 8/2001 | Bastioli et al. | ................ 523/128 |
| 2007/0196679 A1 | * | 8/2007 | Moriyama et al. | ............ 428/518 |

FOREIGN PATENT DOCUMENTS

| JP | 2005-199133 | | 7/2005 |
| JP | 2006-063301 | | 3/2006 |
| JP | 2006-095825 | | 4/2006 |
| JP | 2006089538 A | * | 4/2006 |

OTHER PUBLICATIONS

Report on research results, Development of an environment-adaptation type "chaff/PVA composite material" making use of chaff pulverization techniques, H17, industry-academic-government new technology development project, proposed and publicly offered by Shiga prefecture, School of Engineering, The University of Shiga Prefecture, p. 47 to 78, Mar. 2006.

* cited by examiner

*Primary Examiner* — David W Wu
*Assistant Examiner* — Marie Reddick
(74) *Attorney, Agent, or Firm* — Hamre, Schumann, Mueller & Larson, P.C.

(57) ABSTRACT

This invention provides a chaff molding which is excellent in a compressive strength. Said chaff molding comprises a chaff and a polyvinyl alcohol-based resin having a 1,2-diol structure as a side chain.

13 Claims, No Drawings

CHAFF MOLDING AND PRODUCTION METHOD THEREOF

CROSS-REFERENCE TO RELATED APPLICATIONS

This application claims priority from Japanese Patent Application No. 2007-118210 filed on Apr. 27, 2007, the entire subject matter of which is incorporated herein by reference.

BACKGROUND OF THE INVENTION

1. Field of the Invention

This invention relates to a chaff molding prepared by molding a chaff and a polyvinyl alcohol-based resin (hereinafter, polyvinyl alcohol is referred to as PVA). For more details, the invention relates to a chaff molding excellent in a compressive strength and a sound absorption in an audible range.

2. Description of the Related Art

In recent years, attempts have been energetically made to use an agricultural by-product as a biomass resource. Particularly, since the generating quantity of the by-product of rice as the main crops in Japan, such as a rice straw, a chaff, a rice bran and the like, is vast, their effective application is an important challenge. More particularly, the chaff is useful as an industrial material because it contains a large amount of silica, and for example, an examination has been carried out on the application of a chaff pulverization product obtained by pulverizing this as a filler for reinforcing a synthetic resin. However, since the chaff has a tough shell tissue consisting of cellulose, a pretreatment is required for efficiently pulverizing this. For example, a method in which the chaff is treated with enzyme and then mechanically pulverized (e.g., see Patent Reference 1: JP-A-2005-199133) and the like have been proposed.

As an application of the thus obtained chaff pulverization product, this Patent Reference 1 proposes a molding prepared using, as a binder, a PVA-based resin which is biodegradable similar to the chaff and has excellent affinity for cellulose and silica in the chaff. In addition, as a specific production method, its Examples show a method in which a mixture of a chaff pulverization product with a PVA-based resin water solution is cooled to 0° C. or lower to effect gelation and then dried, and describe that the thus obtained molding has a strength which is sufficient as a structural material.

In such a gel, the continued vinyl alcohol structural units in the PVA molecule chain form a microcrystal in the molecular and between the molecular, the crystal grows during the rising temperature process, and the three-dimensional cross-linked form of PVA obtained using such a crystal structure as a junction point contains water. Thus, in order to obtain a hard gel having a high cross-linking density, it is desirable to use a fully saponified PVA-based resin having large content of vinyl alcohol structural unit.

However, because of its high crystallinity, the fully saponified PVA-based resin requires its dissolution at a high temperature for a prolonged period at the time of preparing its water solution, and poses a tendency in that the PVA-based resin crystallizes with time in the thus obtained water solution and the water solution becomes viscous and undergoes gelation. In addition, there is a case in which a micro junction remained due to imperfect dissolution and a heterogeneously gelled part caused by the crystal formed during preservation become a structural defect in the molding and thereby become a cause of reducing a mechanical strength and the like.

Accordingly, when the gelation phenomenon by cooling of the PVA-based resin water solution is used in the production of the molding, a proper degree of saponification of the PVA-based resin to be used is about 99% by mol, and a PVA-based resin having the degree of saponification of 99% by mol is used in Example 1 of JP-A-2005-199133. When a PVA-based resin having a higher degree of saponification than this is used, the aforementioned heterogeneous gelation during the production process is apt to occur, and when the degree of saponification is low on the contrary, it becomes difficult to obtain a proper gel.

In addition, even when the PVA-based resin having the degree of saponification of about 99% by mol is used, the gel is not formed by one cooling, and even when the gel is obtained, cross-link formation is not sufficient so that the gel is dissolved or the shape is lost in some case in the subsequent heat drying step. Thus, in order to form a hard three-dimensionally cross-linked gel, it was necessary in general to form the hard gel by increasing amount of micro junctions and increasing junction points, by repeating a cooling-rising temperature cycle in which once cooling is performed to 0° C. or lower to effect gelation, and then rising temperature is performed to 0 to 5° C. and cooling is performed again. However, two or more times of repetition of such a cooling-rising temperature cycle has a problem in terms of consuming energy and time.

For the purpose of solving such problems, a method for effecting gelation by cooling under a compressed state has been proposed (e.g., see Non-patent Reference 1: Report on research results, Development of an environment-adaptation type "chaff/PVA composite material" making use of chaff pulverization techniques, H17, Industry-academic-government new technology development project, proposed and publicly offered by Shiga prefecture, School of Engineering, The University of Shiga Prefecture, page 47 to 78). When such a compression cooling method is used, a hard gel can be obtained by one cooling in the case of the use of a PVA-based resin having a degree of saponification of about 99% by mol.

SUMMARY OF THE INVENTION

The moldings shown in Patent Reference 1 and Non-patent Reference 1 were obtained by molding a chaff pulverization product using a PVA-based resin as a binder, but there is a case of using an un-pulverized chaff or a chaff in combination with the chaff pulverization product for the purpose of effecting cost down or obtaining a porous product. However, it was revealed that when a blending ratio of the un-pulverized chaff is increased, an adhesive strength becomes insufficient in a case of a general PVA-based resin used in Patent Reference 1 and the like, a sufficient mechanical strength cannot be obtained, and the product is particularly weak against a compressive pressure.

That is, an object of the invention is to obtain a chaff molding excellent in a compressive strength even when un-pulverized chaff is used as the chaff.

Also, regarding its production method, as described above, a repetition of a cooling-rising temperature rise cycle is disadvantageous from the viewpoint of the production cost, and the case of compression cooling method also has problems in that a special production apparatus is necessary, a size and shape of the molding are limited and the like. Further, the conventional production methods also have a problem in that a range of degree of saponification of the PVA-based resin which can be used is very narrow.

In addition, in the case of the PVA-based resins used in the moldings of Patent Reference 1 and Non-patent Reference 1, a crystal growth rate by rising temperature rise of a micro crystal formed by cooling is slow, and when a rising temperature rate of a drying step is large, there is a case in which the gel is melted or the PVA-based resin migrates to the surface to cause a reduction of strength of the moldings, so that it cannot help but slowly rise temperature which poses a problem of requiring a prolonged period of time for the drying.

Thus, another object of the invention is to provide an efficient production method which solved the above-mentioned problems, as a method for producing a molding by cooling and effecting gelation of a mixture of a chaff and a PVA-based resin water solution.

By taking the above-mentioned circumstances into consideration, the present inventors have conducted intensive studies and found as a result that a chaff molding comprising a chaff and a PVA-based resin, which shows excellent mechanical strength even when an un-pulverized chaff is used, can be obtained by using a PVA-based resin having a 1,2-diol structure as a side chain, and thereby accomplished the invention.

It is considered that such an effect is due to the high affinity of the side chain 1,2-diol structure of the PVA-based resin to be used in the invention for cellulose and silica in the chaff.

In addition, as a production method of such a molding, the invention was accomplished by finding that when the gelation by cooling of a chaff and PVA-based resin water solution is used, a gel having a sufficient strength can be obtained under normal pressure and by one cooling, and it becomes possible to increase the rising temperature rate at the time of drying.

It is considered that this is due to the strong affinity for the chaff and speed of the crystallite growth rate which is possessed by the PVA-based resin to be used in the invention. In particular, the latter is considered to be due to appropriate restriction of mobility of the PVA-based resin between the 1,2-diol structural moiety and silica or between the PVA-based resins.

The following shows the gist of the invention.

1. A chaff molding comprising a chaff and a polyvinyl alcohol-based resin having a 1,2-diol structure as a side chain.

2. The chaff molding according to the above-mentioned 1, which is a plate-shaped form.

3. The chaff molding according to the above-mentioned 1 or 2, wherein the chaff comprises a chaff pulverization product.

4. The chaff molding according to the above-mentioned 3, wherein the chaff pulverization product is contained in an amount of from 5 to 95% by weight based on the total chaff weight in the chaff.

5. The chaff molding according to any one of the above-mentioned 1 to 4, which further comprises inorganic salts.

6. The chaff molding according to the above-mentioned 5, wherein the inorganic salts is sodium sulfate.

7. The chaff molding according to any one of the above-mentioned 1 to 6, wherein the polyvinyl alcohol-based resin having a 1,2-diol structure as a side chain is a polyvinyl alcohol-based resin having a 1,2-diol structural unit represented by the following general formula (1)

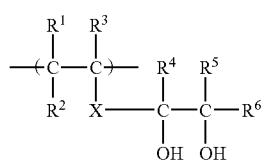

(1)

wherein $R^1$, $R^2$ and $R^3$ each independently represents a hydrogen atom or an organic group, X represents a single bond or a bond chain, and $R^4$, $R^5$ and $R^6$ each independently represents a hydrogen atom or an organic group.

8. The chaff molding according to any one of the above-mentioned 1 to 7, wherein the polyvinyl alcohol-based resin having a 1,2-diol structure as a side chain is a saponified product of a copolymer of a vinyl ester-based monomer with 3,4-diacyloxy-1-butene.

9. The chaff molding according to any one of the above-mentioned 1 to 8, wherein the polyvinyl alcohol-based resin having a 1,2-diol structure as a side chain is contained in an amount of from 1 to 100 parts by weight based on 100 parts by weight of the chaff.

10. The chaff molding according to any one of the above-mentioned 1 to 8, wherein the polyvinyl alcohol resin-based having a 1,2-diol structure as a side chain is contained in an amount of from 3 to 50 parts by weight based on 100 parts by weight of the chaff.

11. The chaff molding according to any one of the above-mentioned 1 to 10, wherein a compressive strength is 4 MPa or more.

12. The chaff molding according to any one of the above-mentioned 1 to 11, wherein an average sound absorption coefficient at a frequency of from 2,000 to 5,000 Hz is 30% or more when a thickness of the molding is 10 mm.

13. A method for producing the chaff molding according to any one of the above-mentioned 1 to 12, wherein a water solution of a mixture of a chaff and a polyvinyl alcohol-based resin having a 1,2-diol structure as a side chain is gelled and the gelled product is dried.

Since the chaff molding of the invention is lightweight weight and excellent in a compressive strength and can be easily made into a porous structure since an un-pulverized chaff can be used, and as a result, a molding having excellent sound absorption, cushioning characteristics and adiathermancy can be obtained, so that it can be used as a substitute for a plastic and lumber, and particularly can be used in various applications such as a construction material, an interior material, an interior material for a car, a noise insulating material for an express highway wall and the like, a sound absorbing material, an adiabatic material, an article of furniture, a cushioning material, an absorbing material for a drug, and filler and the like.

DETAILED DESCRIPTION OF THE INVENTION

Descriptions of the constituent requirements described in the following are an example (typical example) of the embodiments of the invention and not limited to these contents.

The chaff molding of the invention comprises a chaff and a PVA-based having a 1,2-diol structure as a side chain.

The following describes in respective orders.

[Chaff]

Firstly, the chaff to be used in the invention is described.

A chaff is a skin moiety of paddy formed on an ear of a rice and is obtained by separating from an unpolished rice as a content of the paddy, via the steps of a rice reaping, threshing and hulling. According to the invention, such chaff may be used directly, or a part thereof may be a chaff pulverization product. Particularly, when the chaff molding of the invention is used as a sound absorber, it must be porous, and a size of an air gap, amount and form can be controlled and a molding having a desired sound absorption characteristic can be obtained by the use of an un-pulverized chaff, but in order to obtain a molding simultaneously having an excellent strength, it is desirable to use a chaff pulverization product concomitantly.

Such a chaff pulverization product can be obtained by pulverizing the chaff using a known method and a known pulverizer, and generally indicates a product those are 10 mesh pass or smaller. Such a pulverization method is not particularly limited, but since the chaff has an markedly strong outer shell that requires a considerable energy for pulverizing the outer shell with a general mechanical pulverization which also becomes a cause of damaging the pulverizer in some cases, so that preferably those which are obtained by a method in which a cellulose component of the chaff outer shell is saponified with an enzyme in advance and the resulting chaff is further mechanically pulverized, as described in JP-A-2005-199133, are desirable because a grain diameter is small and the crude grain content is low.

In addition, as the method for obtaining a mixture of the un-pulverized chaff and the chaff pulverization product, a method in which the un-pulverized chaff and the chaff pulverization product obtained by the above-mentioned method or the like are mixed at a desired mixing ratio, a method in which pulverization time and strength at the time of preparing the chaff pulverization product are adjusted to make a portion of the chaff into the chaff pulverization product, and the like can be exemplified.

The content ratio of the chaff pulverization product in the chaff is not particularly limited and may be optionally adjusted according to the desired physical property. In general, a range of from 5 to 95% by weight, particularly from 10 to 90% by weight, further from 20 to 80% by weight, based on the total weight of chaff (un-pulverized chaff and chaff pulverization product) is preferably used. Particularly, when such a chaff molding is used as a sound absorber, the content ratio of the chaff pulverization product to be used is from 20 to 90% by weight, particularly from 40 to 80% by weight according to the desired sound absorption characteristic. When the content ratio of such a chaff pulverization product is decreased, it causes a tendency in that the obtained chaff molding shows lowered compressive strength or becomes brittle, and when the content ratio thereof is increased on the contrary, it causes a tendency of lowering sound absorption characteristic.

[PVA-Based Resin]

Next, the PVA-based resin to be used in the invention is described.

The PVA-based resin to be used in the chaff molding of the invention has a 1,2-diol structure as a side chain, and particularly a PVA-based resin having a 1,2-diol structural unit represented by the following general formula (1) is preferably used.

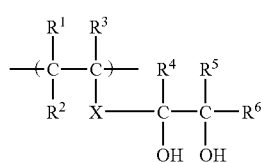

(1)

Wherein $R^1$, $R^2$ and $R^3$ each independently represents a hydrogen atom or an organic group, X represents single bond or a bond chain, and $R^4$, $R^5$ and $R^6$ each independently represents a hydrogen atom or an organic group.

In this connection, the PVA-based resin to be used in the invention is obtained by saponifying a polyvinyl ester-based resin obtained by polymerizing a monomer which is mainly a vinyl ester-based monomer. The content ratio of the 1,2-diol structural unit represented by the general formula (1) is generally approximately from 0.1 to 10% by mol, and the remaining part comprises a vinyl alcohol structural unit and a vinyl acetate structural unit in some quantity, which is similar to the case of the general PVA-based resin.

It is desirable that all of the $R^1$ to $R^3$ and $R^4$ to $R^6$ in the 1,2-diol structural unit represented by the general formula (1) are hydrogen atoms, but these may be organic groups with the proviso that they do not sharply spoil the resin characteristics. The organic group is not particularly limited, but an alkyl group having from 1 to 4 carbon atoms for example, a methyl group, an ethyl group, an n-propyl group, an isopropyl group, an n-butyl group, an isobutyl group, a tert-butyl group and the like is desirable. The organic group may have a substituent group such as a halogen group, a hydroxyl group, an ester group, a carboxylic group, a sulfonate group or the like as occasion demands.

In addition, the X in the 1,2-diol structural unit represented by the general formula (1) is typically a single bond and the single bond is most desirable from the viewpoint of various stabilities such as a thermal stability and the like, but it may be a bond chain within such a range that it does not inhibit the effect of the invention. Examples of such a bond chain, though not particularly limited, include hydrocarbon such as alkylene, alkenylene, alkynylene, phenylene, naphthylene and the like (these hydrocarbons may be substituted with halogen or the like such as fluorine, chlorine, bromine and the like), as well as —O—, —(CH$_2$O)$_m$—, —(OCH$_2$)$_m$—, —(CH$_2$O)$_m$CH$_2$—, —CO—, —COCO—, —CO(CH$_2$)$_m$CO—, —CO(C$_6$H$_4$)CO—, —S—, —CS—, —SO—, —SO$_2$—, —NR—, —CONR—, —NRCO—, —CSNR—, —NRCS—, —NRNR—, —HPO$_4$—, —Si(OR)$_2$—, —OSi(OR)$_2$—, —OSi(OR)$_2$O—, —Ti(OR)$_2$—, —OTi(OR)$_2$—, —OTi(OR)$_2$O—, —Al(OR)—, —OAl(OR)—, —OAl(OR)O— and the like (R is each independently an optional substituent group, preferably a hydrogen atom or an alkyl group, and m is a positive integer). Among them, an alkylene group having 6 or less carbon atoms, particularly a methylene group or —CH$_2$OCH$_2$—, is preferable from the viewpoint of the stability when produced or used.

Though the production method of the PVA-based resin to be used in the invention is not particularly limited, (i) a method in which a copolymer of a vinyl ester-based monomer and a compound represented by the following general formula (2) is saponified, (ii) a method in which a copolymer of a vinyl ester-based monomer and a compound represented by the following general formula (3) is saponified and decarboxylated and (iii) a method in which a copolymer of a vinyl ester-based monomer and a compound represented by the following general formula (4) is saponified and subjected to solvolysis of ketal structure are desirably used.

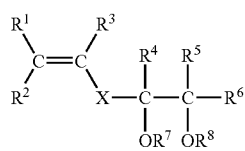

(2)

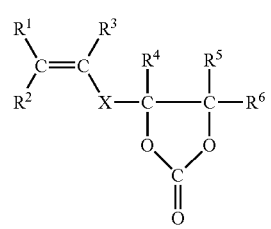

(3)

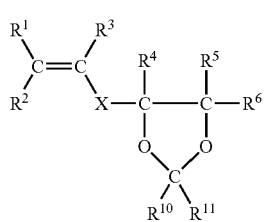

(4)

Each of $R^1$, $R^2$, $R^3$, X, $R^4$, $R^5$ and $R^6$ in the above-mentioned general formulae (2), (3) and (4) is the same as the case of the general formula (1). $R^7$ and $R^8$ are each independently a hydrogen atom or $R^9$—CO— (in the formula, $R^9$ is an alkyl group). $R^{10}$ and $R^{11}$ are each independently a hydrogen atom or an organic group.

Regarding the methods of (i), (ii) and (iii), for example, the methods described in JP-A-2006-95825 can be employed.

Among them, the 3,4-diacyloxy-1-butene wherein $R^1$ to $R^6$ are hydrogen, X is a single bond, $R^7$ and $R^8$ are $R^9$—CO— and $R^9$ is an alkyl group is desirable from the viewpoint of excellent copolymerizable reactivity and an industrial handling property, further particularly among them, the 3,4-diacetoxy-1-butene wherein $R^9$ is a methyl group is preferably used.

In this connection, a reactivity ratio of each monomer, when vinyl acetate is used as the vinyl ester-based monomer and copolymerized with the 3,4-diacetoxy-1-butene, is r (vinyl acetate)=0.710 and r (3,4-diacetoxy-1-butene)=0.701. This shows that the 3,4-diacetoxy-1-butene is superior in its copolymerization reactivity with vinyl acetate in comparison with the r (vinyl acetate)=0.85 and r (vinylethylene carbonate)=5.4 of the case of vinylethylene carbonate as a compound represented by the general formula (3) to be used in the method of (ii).

Also, a chain transfer constant of the 3,4-diacetoxy-1-butene is Cx (3,4-diacetoxy-1-butene)=0.003 (65° C.), and this shows that there is no difficulty in increasing its degree of polymerization and it does not become a cause of reducing the rate of polymerization, in comparison with the Cx (vinylethylene carbonate)=0.005 (65° C.) of the case of vinylethylene carbonate and the Cx (2,2-dimethyl-4-vinyl-1,3-dioxolan)=0.023 (65° C.) of the case of 2,2-dimethyl-4-vinyl-1,3-dioxolan as a compound represented by the general formula (4) to be used in the method of (iii).

In addition, regarding the 3,4-diacetoxy-1-butene, the by-product which is generated when its copolymer is saponified is the same compound which is by-produced at the time of saponification from a structural unit derived from vinyl acetate frequently used as a vinyl ester-based monomer, so that it is not necessary to arrange a special apparatus and step for its after treatment, and this is also an industrially important advantage.

In this connection, as the above-mentioned 3,4-diacetoxy-1-butene, for example, a product produced through a synthesis route in which the 1,3-butadiene was used as the starting material described in WO 00/24702 or a product produced using an epoxybutene derivative by the techniques described in U.S. Pat. No. 5,623,086 and U.S. Pat. No. 6,072,079 as an intermediate can be obtained, or at a regent level, the products manufactured by Acros can be obtained respectively from a market. Also, the 3,4-diacetoxy-1-butene which is obtained as a by-product during the production process of 1,4-butanediol can be also used.

In addition, 1,4-diacetoxy-1-butene can also be used by converting it into 3,4-diacetoxy-1-butene by a known isomerization reaction in which a metallic catalyst such as palladium chloride is used.

As the above-mentioned vinyl ester-based monomer, vinyl formate, vinyl acetate, vinyl propionate, vinyl valerate, vinyl butyrate, vinyl isobutyrate, vinyl pivalate, vinyl caprate, vinyl laurate, vinyl stearate, vinyl benzoate, vinyl versatate and the like can be exemplified, of which the vinyl acetate is preferably used from the economical point of view.

Also, other than the above-mentioned monomers (vinyl ester-based monomers and the compounds represented by the general formulae (2), (3) and (4)), α-olefin such as ethylene, propylene or the like; hydroxyl group-containing α-olefins such as 3-buten-1-ol, 4-penten-1-ol or the like; an unsaturated acid such as itaconic acid, maleic acid, acrylic acid or the like or a salt thereof or a mono- or dialkyl ester; nitriles such as acrylonitrile or the like; amides such as methacrylamide or the like; olefin sulfonic acid such as ethylenesulfonic acid, allylsulfonic acid, methallylsulfonic acid or the like or a salt thereof or the like compound; or vinylene carbonates or the like may be copolymerized as a copolymerization component, in a range within which the component does not exert sharp influence upon the physical property of the resin.

A content of the side chain 1,2-diol structural unit to be contained in the PVA-based resin is generally from 0.1 to 20% by mol based on the total structural units. Particularly, in the case of a molding method in which the PVA-based resin is used as a water solution and gelled under cooling together with the chaff, it is desirable that the content of the side chain 1,2-diol structural unit to be contained is from 0.1 to 5% by mol, particularly from 0.5 to 4% by mol. When such a content is too small or too large, it becomes difficult to obtain a hard gel so that two or more times of the cooling-rising temperature cycle becomes necessary in some cases. In addition, when such a content is too small, a mechanical strength of the obtained molding becomes insufficient in some cases.

It is desirable that the content of a structural unit other than the vinyl alcohol structural unit, vinyl acetate structural unit and side chain 1,2-diol structural unit contained in the PVA-based resin is generally 10% by mol or less, particularly 5% by mol or less, further 3% by mol or less, based on the total structural units. When such a content is too large, the water solubility is inhibited or the gel-forming property is inhibited in some case, though it depends on the kinds of structural units.

In addition, since the PVA-based resin to be used in the invention has a low melting point and a large difference in degradation temperature in comparison with the unmodified PVA-based resin, heat-melt molding is possible, so that it is also possible to produce the molding of the invention by melt molding. When such a molding method is used, it is desirable that the PVA-based resin has a side chain 1,2-diol structural unit in an amount of from 3 to 15% by mol, particularly from 4 to 10% by mol. When such a content amount is too small, a high temperature is required at the time of melt molding so that there is a tendency of causing thermal decomposition of the chaff.

In this connection, the content of the side chain 1,2-diol structural unit in the PVA-based resin can be calculated from a $^1$H-NMR spectrum (solvent: DMSO-d6, internal standard: tetramethylsilane) of a completely saponified PVA-based resin. Specifically, it may be calculated from a peak area derived from hydroxyl group proton, methine proton and methylene proton in the 1,2-diol unit, methylene proton of the main chain, proton of the hydroxyl group which bonded to the main chain and the like.

Also, an average degree of polymerization (measured in accordance with JIS K6726) of the PVA-based resin is generally from 50 to 5,000. When the cooling gelation method is used, the average degree of polymerization is preferably from 1,000 to 5,000, further from 2,000 to 4,000. When such an average degree of polymerization is too small, there is a case in which a molding having sufficient strength cannot be obtained. When too large on the contrary, when the PVA-based resin is handled as the water solution, its viscosity becomes so high that a working property is lowered, so that both cases are not desirable. Also, when the melt molding method is used, it is generally from 50 to 2,000, particularly preferably from 200 to 1,500, further from 200 to 1,200. When the degree of polymerization of the PVA-based resin is too large, there is a tendency that sufficient mechanical strength cannot be obtained when made into a molding due to insufficient fluidity of the PVA-based resin.

In addition, the degree of saponification of the PVA-based resin is generally from 80 to 100% by mol. Particularly, when the cooling gelation method is used, a degree of saponification of as high as possible is desirable because a firm gel can be easily obtained, which is generally from 96 to 100% by mol, preferably from 98 to 100% by mol.

In this connection, different from the publicly known counterparts, the PVA-based resin to be used in the invention is easy to be dissolved in water even in the case of a high degree of saponification product having a degree of saponification of exceeding 99% by mol so that an un-dissolved crystalline moiety is less. In addition, different from the general low degree of saponification product which is excellent in solubility, the gelation property by cooling is good so that a proper gel can be obtained.

Also, in the case of the melt molding method, it is desirable that the degree of saponification is from 80 to 100% by mol, particularly from 85 to 99% by mol. When the degree of saponification is too low, it is not desirable because there is a case in which interaction with the chaff is reduced and strength of the mold therefore is reduced.

In addition, the PVA-based resin having a 1,2-diol structural unit to be used in the invention may be a mixture with a different other PVA-based resin. Such an other PVA-based resin includes those which have a different content of the 1,2-diol structural unit represented by the general formula (1), those which have a different degree of saponification, those which have a different degree of polymerization, those in which the other copolymer component is different, those which do not have a modification group and the like.

[Production Method of Chaff Molding]

Though the production method of the chaff molding of the invention is not particularly limited, (a) a method in which a water solution of a mixture of a chaff with a PVA-based resin is gelled and then dried and (b) a method in which a PVA-based resin and a chaff are subjected to a heat melt molding can be exemplified as desirable production methods which make the most of the characteristics of the PVA-based resin to be used in the invention having a 1,2-diol structure as a side chain.

Firstly, the method (a) is described.

Though the method for preparing the water solution of a mixture of a chaff with a PVA-based resin is not particularly limited, (i) a method in which a PVA-based resin is made into a water solution in advance, and a chaff is added thereto and mixed, (ii) a method in which a powdery PVA-based resin and a chaff are dry-blended, and the PVA-based resin is dissolved by adding water thereto and raising temperature while stirring, (iii) a method in which a powdery PVA-based resin and a chaff are dry-blended and packed in a desired mold, and the PVA-based resin is dissolved by allowing water to be contained therein and heating it, and the like can be exemplified.

Since the PVA-based resin to be used in the invention having a 1,2-diol structure as a side chain is easily dissolved even when it is a high saponified product, in comparison with a general PVA-based resin, when it alone is made into a water solution, it can be completely dissolved at a low temperature with a short period. In addition, in the case of the method of (iii), an un-dissolved residue is apt to remain because stirring operation cannot be carried out when PVA is dissolved, but the PVA-based resin of the invention has an advantage in that such a problem hardly occurs, so that the step of dissolving PVA-based resin can be omitted which is industrially useful.

In this connection, according to the method of (iii), depending on the condition for dry-blending the chaff and PVA-based resin and the conditions for preserving and transferring after the blending, there is a possibility of generation of their uneven distribution in the mixture. As a means for solving this problem, a method in which a part or entire portion of the PVA-based resin is made into a water solution in advance, mixed with the chaff and dried, thereby effecting adhesion of the PVA-based resin to the chaff surface, is suitably used.

In addition, as the method for allowing optimum amount of water to be contained in the mixture of the chaff and PVA-based resin, a method in which a mixture of the chaff and PVA-based resin is once soaked in water and the excess water is removed by filtration or the like is suitably used. However, in that case, there is a possibility of causing elution of the PVA-based resin into the removed water. As a means for solving this problem, the elution of the PVA-based resin can be suppressed by allowing inorganic salts having a salting-out effect for PVA-based resin to be contained in either the mixture of PVA-based resin and chaff or water.

As such inorganic salts include a sulfate such as ammonium sulfate, sodium sulfate, potassium sulfate, zinc sulfate, copper sulfate, iron sulfate, magnesium sulfate, aluminum sulfate, alum and the like, a nitrate such as ammonium nitrate, sodium nitrate, potassium nitrate, aluminum nitrate and the like, a chloride such as sodium chloride, potassium chloride and the like, a phosphate such as sodium phosphate and the like, a chromate such as potassium chromate and the like and a borate such as sodium borate and the like, of which sodium sulfate is suitably used because of its particularly large salting-out effect for the PVA-based resin and from the viewpoint of an excellent safety.

It is desirable that the blending ratio of a chaff and PVA-based resin is generally from 1 to 100 parts by weight, particularly from 5 to 50 parts by weight, further from 10 to 30 parts by weight, based on 100 parts by weight of the chaff. When the blending ratio of the PVA-based resin is too large according to such content, a strength of the molding becomes insufficient in some cases, and when too small on the contrary, the effect by using chaff cannot fully be exerted.

It is desirable that the content of inorganic salts in the chaff molding in the case of the concomitant use of inorganic salts is generally from 1 to 20 parts by weight, particularly from 2 to 10 parts by weight, further from 3 to 5 parts by weight, based on 100 parts by weight of the PVA-based resin. When the inorganic salts content is too small, the salting-out effect for PVA-based resin cannot be obtained, and when too large, excess inorganic salts leak out on the surface and external moiety of the mold and sometimes become the cause of corrosion of a peripheral metallic material.

In addition, in the case of the method of (i) or (ii), it is desirable that the content of PVA-based resin and water, as PVA-based resin/water (weight ratio), is generally from 0.1/

100 to 100/100, particularly from 1/100 to 50/100, further from 1/100 to 30/100. In such a content, when the ratio of water is too large, an energy and time necessary for the drying are increased so that it sometimes becomes disadvantageous from the cost point of view, and when too small on the contrary, it becomes difficult to completely dissolve the PVA-based resin so that there is a tendency of becoming difficult to obtain proper mixed state of the chaff and PVA-based resin.

The mixture of chaff and PVA-based resin water solution obtained by the method of (i) and (ii) is subsequently packed in a desired mold and gelled in the next step.

When gelled by the cooling method, the cooling temperature is generally 0° C. or lower, and it is desirable to carry out it at further lower temperature in order to obtain a harder molding. It is desirable to cool particularly to −5° C. or lower, further to −20° C. or lower. In this connection, the period for keeping a cooled state is not particularly limited, and the cooling may be stopped when a formation of a sufficiently hard gel was confirmed, but is generally 5 minutes or more, more preferably 1 hour or more.

According to the invention, the hard gel is obtained by one operation of such a cooling gelation by the use of the PVA-based resin having a 1,2-diol structural unit as a side chain, but a harder gel can be prepared by rising temperature of this to approximately from 0 to 5° C. and again cooling it, or by repeating this cycle two or more times.

In this connection, it is possible to accelerate the gelation by concomitantly using the above-mentioned salt having a salting-out effect for PVA-based resin or a cross-linking agent such as boric acid in the gelation of such a PVA-based resin. Improvement of gelation rate, rising of the cooling temperature necessary for the gelation and improvement of strength of the obtained gel can be expected from this.

Such a cross-linking agent is not particularly limited with the proviso that it is known as across-linking agent of PVA-based resin, but those which are soluble in water are desirable, and for example, metal salts such as of aluminum, titanium, zirconium and the like, boric acid, borax and the like can be exemplified.

The thus obtained gel is then dried, and the conditions in that case are not particularly limited and the gel may be heated by a known method. However, when it is rapidly exposed to an atmosphere of high temperature, the gel is melted in some cases depending on the condition, so that it is desirable to rise temperature from a low temperature. The rising starting temperature in that case is generally 60° C. or lower, more preferably 50° C. or lower, further preferably 40° C. or lower. The rising temperature rate is generally from 2 to 10° C./min, particularly from 3 to 8° C./min, preferably from 4 to 7° C./min.

Such a rising temperature rate of as high as possible is desirable because it results in the shortening of production time. However, in the case of a gel which used a conventional PVA-based resin, increase of the rising temperature rate to too high level sometimes results in the melting of the gel in the middle of the operation, migration of the PVA-based resin to the molding surface or loosening of the shape, so that it was difficult to set it substantially to 3° C. or higher. According to the invention, it becomes possible to increase such a rising temperature rate by the use of the PVA-based resin having a 1,2-diol structure as a side chain, and this results in the shortening of the production time which is an industrially big advantage. It is considered that why such an effect was obtained in the production method of the invention is because a hard gelled substance having markedly good affinity between the PVA-based resin and chaff was formed.

In addition, the final temperature is generally 80° C. or higher, particularly 90° C. or higher, and a retention time at that temperature may not be determined because it varies depending on the size and shape of the dried material, but may be optionally selected depending on the drying state of the gel. In addition, drying under a reduced pressure is also desirable because it can be dried at further lower temperature with further shorter period.

According to the invention, since a PVA-based resin having a 1,2-diol structure as a side chain is used as the PVA-based resin, such a cooling gelation is sufficiently possible under normal pressure, but a further harder gel and a molding can be obtained by cooling under a pressurized state. The pressure in that case is generally from 1 to 20 atmospheric pressures, particularly from 1.5 to 10 atmospheric pressures, more preferably from 2 to 5 atmospheric pressures. Too high pressure does not change the effect.

Next, the method of (b) is described.

In this method, a mixture of a PVA-based resin having a 1,2-diol structural unit as a side chain and chaff is melt by heating to unify and the character that such a PVA-based resin has a lower melting point in comparison with a general PVA-based resin is utilized.

Firstly, the method for mixing the chaff with the PVA-based resin is not particularly limited, but it can be achieved generally by dry-blending a powdery PVA-based resin with the chaff.

The blending ratio of the chaff and PVA-based resin in this case is generally from 1 to 100 parts by weight, particularly from 3 to 50 parts by weight, further preferably from 5 to 30 parts by weight, based on 100 parts by weight of the chaff. When the ratio of PVA-based resin regarding such a content is too small, it is not desirable because the strength of the molding becomes insufficient in some cases.

In this connection, a plasticizer and moisture may be blended with such a mixture of the chaff and PVA-based resin in order to obtain good heat melt molding ability, and the blending amount is generally from 0.1 to 10 parts by weight, particularly preferably from 1 to 5 parts by weight, based on 100 parts by weight of the PVA-based resin.

The thus obtained mixture of the chaff and PVA-based resin is then packed in a metal mold or the like and heated to allow the PVA-based resin to be melted. The temperature in that case may not be determined because it varies depending on the side chain 1,2-diol structural unit content and the plasticizer or moisture content in the PVA-based resin, but is generally from 100 to 150° C., particularly preferably from 100 to 140° C. When such a heating temperature is too high, the chaff is thermally decomposed in some cases, and when too low on the contrary, the PVA-based resin does not melt sufficiently so that it becomes difficult to obtain a hard molding.

In this connection, it becomes possible to obtain a harder molding by pressurizing at the time of such molding, and the pressure at that time is generally from 5 to 100 kg/cm$^2$, preferably from 10 to 50 kg/m$^2$. Particularly, in the case of the use of the molding of the invention as a sound absorber, a proper air gap is not formed when the pressure to be applied is too high, so that it tends to become difficult to obtain a good porous product.

[Additive Agent]

Other than the above-mentioned components, the chaff molding of the invention may contain various organic powders or inorganic powders within such a range that they do not inhibit the objects of the invention.

The organic powder is not particularly limited with the proviso that it is a known material, and for example, coffee beans refuse, strained lees at the time of producing alcohols such as beer, sake and the like, a chaff pulverization product of cereal other than rice, wheat powder by wheat flour milling, corm starch refuse, bean curd refuse, sawdust and the like biomass resources, which is similar to the case of the chaff pulverization product, can be exemplified.

Also, the inorganic powder is also not particularly limited, with the proviso that it is a known material, and for example, silica, alumina, titanium oxide, calcium carbonate and the like pigments can be exemplified.

In addition, for the purpose of adjusting adhesive strength for the chaff pulverization product, it is possible to comprise various water-soluble polymers and, for example, various modified PVA-based resins other than the PVA-based resin to be used in the invention having a 1,2-diol structure as a side chain, such as unmodified PVA and cation-modified PVA solely consisting of a vinyl alcohol structural unit and a vinyl acetate structural unit, carboxylic acid-modified PVA, sulfonic acid-modified PVA, silanol group-containing PVA, ethylene-modified PVA having an ethylene content of 60% or less and the like. As various water-soluble resins other than a PVA resin, polysaccharides such as starch, cellulose and the like, polyethylene glycol, polyvinyl pyrrolidone, polyoxazoline, water-soluble polyamide, water-soluble polyester, polyacrylamide, polyethyleneimine and the like can be exemplified.

Also, a plasticizer, an ultraviolet ray absorbent, an antioxidant, a coloring agent, a filler, an antistatic agent, a heat stabilizer, a surfactant, a desiccant, a deodorant, an antibacterial agent, an oxygen absorbent, an anti-blocking agent, a slipping agent, a cross-linking agent and the like can be contained as various additive agents in the same manner.

In addition, when a mixture of the PVA divalent alcohols resin of (b) and the chaff is subjected to heat melt molding, it is desirable to use a plasticizer concomitantly, in order to control the molding temperature.

As such a plasticizer, it is not particularly limited with the proviso that it is a known plasticizer which is used in a PVA resin, but it is particularly desirable to use a polyhydric alcohol alkylene oxide addition product.

Such a polyhydric alcohol is not particularly limited, but in general, an aliphatic polyhydric alcohol having from 2 to 20 carbon atoms is used, and particularly, an aliphatic polyhydric alcohol having from 2 to 10 carbon atoms is preferably used. In addition, the number of its valences is generally from 2 to 6, and specifically, divalent alcohols such as ethylene glycol, triethylene glycol and the like, trivalent alcohols such as glycerin and the like, tetravalent alcohols such as diglycerol, pentaerythritol and the like, pentavalent or more polyhydric alcohols such as mannitol, sorbitol and the like can be exemplified, of which those having the number of valences of from 2 to 5 are preferably used, and glycerin as an aliphatic trivalent alcohol is particularly preferably used.

Also, the alkylene oxide is not particularly limited, but a mono- to trivalent alkylene oxide is generally used, and a monovalent alkylene oxide is particularly preferably used. In addition, the number of its carbon atoms is generally from 2 to 20, and an alkylene oxide having from 2 to 10 carbon atoms is particularly preferably used.

Specific examples of such an alkylene oxide include ethylene oxide, propylene oxide, epoxybutanes such as 1,2-epoxybutane, 2,3-epoxybutane, 3-methyl-1,2-epoxybutane and the like, epoxypentanes such as 1,2-epoxypentane, 2,3-epoxypentane, 3-methyl-1,2-epoxypentane, 4-methyl-1,2-epoxypentane, 4-methyl-2,3-epoxypentane, 3-ethyl-1,2-epoxypentane and the like, epoxyhexanes such as 1,2-epoxyhexane, 2,3-epoxyhexane, 3,4-epoxyhexane, 3-methyl-1,2-epoxyhexane, 4-methyl-1,2-epoxyhexane, 5-methyl-1,2-epoxyhexane, 3-ethyl-1,2-epoxyhexane, 3-propyl-1,2-epoxyhexane, 4-ethyl-1,2-epoxyhexane, 5-methyl-1,2-epoxyhexane, 4-methyl-2,3-epoxyhexane, 4-ethyl-2,3-epoxyhexane, 2-methyl-3,4-epoxyhexane, 2,5-dimethyl-3,4-epoxyhexane and the like, epoxyheptanes such as 3-methyl-1,2-epoxyheptane, 4-methyl-1,2-epoxyheptane, 5-methyl-1,2-epoxyheptane, 6-methyl-1,2-epoxyheptane, 3-ethyl-1,2-epoxyheptane, 3-propyl-1,2-epoxyheptane, 3-butyl-1,2-epoxyheptane, 4-ethyl-1,2-epoxyheptane, 4-propyl-1,2-epoxyheptane, 5-ethyl-1,2-epoxyheptane, 4-methyl-2,3-epoxyheptane, 4-ethyl-2,3-epoxyheptane, 4-propyl-2,3-epoxyheptane, 2-methyl-3,4-epoxyheptane, 5-methyl-3,4-epoxyheptane, 5-ethyl-3,4-epoxyheptane, 2,5-dimethyl-3,4-epoxyheptane, 2-methyl-5-ethyl-3,4-epoxyheptane, 1,2-epoxyheptane, 2,3-epoxyheptane, 3,4-epoxyheptane and the like, epoxyoctanes such as 1,2-epoxyoctane, 2,3-epoxyoctane, 3,4-epoxyoctane, 4,5-epoxyoctane and the like, epoxynonanes such as 1,2-epoxynonane, 2,3-epoxynonane, 3,4-epoxynonane, 4,5-epoxynonane and the like, epoxydecanes such as 1,2-epoxydecane, 2,3-epoxydecane, 3,4-epoxydecane, 4,5-epoxydecane, 5,6-epoxydecane and the like, epoxyundecanes such as 1,2-epoxyundecane, 2,3-epoxyundecane, 3,4-epoxyundecane, 4,5-epoxyundecane, 5,6-epoxyundecane and the like, epoxydodecanes such as 1,2-epoxydodecane, 2,3-epoxydodecane, 3,4-epoxydodecane, 4,5-epoxydodecane, 5,6-epoxydodecane, 6,7-epoxydodecane and the like, and aliphatic epoxy compounds thereof and the like.

Among them, a monovalent alkylene oxide having 5 or less carbon atoms is preferable and ethylene oxide and propylene oxide are particularly preferable, and the most preferable is ethylene oxide.

Additive amount of the alkylene oxide based on 1 mole of the polyhydric alcohol is generally from 1 to 12 moles, preferably from 1 to 9 moles, and particularly preferably from 1 to 3 moles.

When these data are generalized, a compound in which ethylene oxide is added to glycerin can be exemplified as one of the desirable plasticizers, and "Uniox G-150" and "Uniox G-180" manufactured by Nippon Oil & Fat Company can be exemplified as an article on the market which comprises such a compound.

In this connection, the content of such a plasticizer may not be determined because it varies depending on the PVA-based resin to be used or desired molding temperature, but is generally from 3 to 20% by weight, preferably from 3 to 15% by weight, based on the PVA-based resin.

[Chaff Molding]

Next, the chaff molding of the invention obtained by the above-mentioned method is described.

It is possible to make the chaff molding of the invention into a shape suited for each application by using an optional mold, or cutting out from the obtained molding, in the above-mentioned production method. For example, a plate-shaped form such as a flat plate-shaped form, a curved plate-shaped form or the like, a block-shaped form, a spherical form, a granular form and the like various shapes can be exemplified, and those which are formed into a plate-shaped form are desirably used.

A density of the chaff molding of the invention is generally from 0.05 to 3 $g/cm^3$, and it is possible to control this by the blending ratio of the chaff and PVA-based resin or the blending ratio of the chaff and chaff pulverization product, and when an inorganic powder or the like other additive agent was used, it is possible to control by its blending amount, molding method and the like. Particularly when the molding of the invention is used as a sound absorber, it is preferably a porous form, and the density of the chaff molding in that case is generally from 0.05 to 1 g/cm³.

The chaff molding of the invention is excellent in a mechanical strength, and particularly excellent in a hardness at the time of compression. Specifically, in a compression test carried out at a compression rate of 5 mm/min, its stress (compression strength) at the time of 40% strain becomes 4 MPa or more, further 9 MPa or more, thus showing a markedly good value.

In addition, when the chaff molding of the invention is made into a porous form by carrying out the above-mentioned respective control, it shows a sound absorption property within the audible range of from 1,500 to 6,000 Hz, and in general, an average sound absorption coefficient within from 2,000 to 5,000 Hz when its thickness is set to 10 mm is 30% or more, and it is possible to increase the value to 60% or more.

EXAMPLES

The following describes the invention with reference to examples, but the invention is not limited to the descriptions of the examples unless exceeding its gist.

In addition, evaluation of a chaff molding is carried out in the examples by preparing it by a method in which a water solution of a PVA-based resin is cooled and gelled together with a chaff and then dried. But the tendency of such evaluation results represents those by the other production methods, and the production methods described in the examples do not limit the embodiments of the invention.

Example 1

(1) Preparation of PVA-Based Resin

In accordance with the Production Example 1 of JP-A-2006-95825, vinyl acetate and 3,4-diacetoxy-1-butene were copolymerized, and were saponified to produce a PVA-based resin having a side chain 1,2-diol structural unit content of 0.5% by mol, a degree of polymerization of 2,600 and a degree of saponification of 99.2% by mol.

(2) Preparation of Chaff Molding

A chaff and a chaff pulverization product (200-mesh passed product) obtained by mechanically pulverizing the chaff were added to and mixed with a 10% water solution of the PVA-based resin obtained in (1), in respective amounts of 300 parts by weight and 200 parts by weight based on 100 parts by weight of the PVA-based resin, and the thus obtained dispersion was poured into a mold of 50 mm in inner diameter and 10 mm in depth. This was placed in a refrigerator of −20° C. for 1.5 hours and then placed in a refrigerator of 5° C. for 15 hours or more to effect gelation. This was placed in a constant-temperature apparatus of 40° C., subjected to rising temperature to 90° C. at a rate of 2° C./min, and then dried by keeping the temperature for 2 hours to obtain a plate-shaped form chaff molding having a thickness of 10 mm.

(3) Evaluation

The following evaluations were carried out on the thus obtained chaff molding.
[Compressive Strength]
A compressive strength of a sample for compressive strength measurement use (10 mm in thickness) cut out from the obtained chaff molding was measured using a universal tensile strength tester (INSTRON). The measuring environment was 20° C. and 60% RH, and this was carried out at a compression rate of 5 mm/min. A stress at the time of 40% strain was calculated from the obtained stress strain curve and used as the compressive strength. The results are shown in Table 1.
[Sound Absorption Coefficient]
A sound absorption coefficient of a sample for sound absorption characteristics evaluation (10 mm in thickness) cut out from the obtained chaff molding was measured using a sound absorption coefficient measuring apparatus ("microphone impedance measuring apparatus MS-1020 type" manufactured by Bruel & Kjaer) on a frequency range of from 500 to 6,500 Hz, and average value of the sound absorption coefficient within a frequency of from 2,000 to 5,000 was calculated. The results are shown in Table 1.

Example 2

A chaff molding was prepared in the same manner as in Example 1, except that additive amounts of the chaff and pulverized chaff were respectively set to 200 parts by weight and 300 parts by weight based on 100 parts by weight of the PVA-based resin, and evaluated in the same manner. The results are shown in Table 1.

Example 3

A chaff molding was prepared in the same manner as in Example 1, except that additive amounts of the chaff and pulverized chaff were respectively set to 100 parts by weight and 400 parts by weight based on 100 parts by weight of the PVA-based resin, and evaluated in the same manner. The results are shown in Table 1.

Example 4

A chaff molding was prepared in the same manner as in Example 1, except that the rising temperature rate after gelation was set to 4° C./min in Example 3, and evaluated in the same manner. The results are shown in Table 1.

Example 5

A chaff molding was prepared in the same manner as in Example 4, except that a PVA-based resin having a side chain 1,2-diol structural unit content of 1% by mol, a degree of polymerization of 1,700 and a degree of saponification of 99% by mol was used as the PVA-based resin, and evaluated in the same manner. The results are shown in Table 1.

Example 6

A chaff molding was prepared in the same manner as in Example 4, except that a PVA-based resin having a side chain 1,2-diol structural unit content of 3% by mol, a degree of polymerization of 1,300 and a degree of saponification of 99% by mol was used as the PVA-based resin, and evaluated in the same manner. The results are shown in Table 1.

Comparative Example 1

When a PVA-based resin which does not have a side chain 1,2-diol structural unit and has a degree of polymerization of 1,700 and a degree of saponification of 99% by mol was used as the PVA-based resin, it was not sufficiently gelled by one cooling, so that a chaff molding was prepared in the same manner as in Example 1, except that it was gelled by repeating the cooling cycles at −20° C. and 5° C. further three times, and evaluated in the same manner. The results are shown in Table 1.

Comparative Example 2

When the rising temperature rate after gelation was set to 4° C./min in Comparative Example 1, the gel was melted at the time of temperature rising so that it was unable to obtain a chaff molding.

TABLE 1

| | Side chain 1,2-diol content (% by mol) | Chaff/ pulverized chaff product/ PVA-based resin | Rising temperature rate (° C./min) | Compressive strength (MPa) | Average sound absorption coefficient (%) |
|---|---|---|---|---|---|
| Ex. 1 | 0.5 | 3/2/1 | 2 | 9.7 | 64.1 |
| Ex. 2 | 0.5 | 2/3/1 | 2 | 4.9 | 63.2 |
| Ex. 3 | 0.5 | 1/4/1 | 2 | 4.5 | 63.7 |
| Ex. 4 | 0.5 | 1/4/1 | 4 | 4.3 | 37.3 |
| Ex. 5 | 1 | 3/2/1 | 4 | 6.9 | Unmeasured |
| Ex. 6 | 3 | 3/2/1 | 4 | 5.4 | Unmeasured |
| Comp. Ex. 1 | 0 | 3/2/1 | 2 | 2.1 | Unmeasured |
| Comp. Ex. 2 | 0 | 3/2/1 | 4 | Molding was not obtained | |

Example 7

A chaff and a chaff pulverization product (200 mesh-passed product) obtained by mechanically pulverizing the chaff were added to and mixed with the 10% PVA-based resin water solution used in Example 1, in respective amounts of 400 parts by weight and 100 parts by weight based on 100 parts by weight of the PVA-based resin, and spread on a tray and dried to obtain a mixture of the chaff and chaff pulverization product which were surface-coated with the PVA-based resin.

This mixture was soaked in a 50 g/l water solution of sodium sulfate for 5 minutes and then pulled out to obtain a water-containing mixture of the chaff and PVA-based resin. In this connection, outflow of the PVA-based resin from the chaff/PVA-based resin mixture into the water solution was not found by this operation.

It is possible to make the thus obtained a water-containing mixture of chaff/PVA-based resin into a plate-shaped form chaff molding by subsequently carrying out the same operation in Example 1.

Since the chaff molding of the invention is light-weight and excellent in a compressive strength and can use an un-pulverized chaff, it can be easily made into a porous structure. As a result, a molding having excellent sound absorption, cushioning characteristics and adiathermancy can be obtained, so that it can be used as a substitute for a plastic and lumber, and particularly can be used in various applications such as a construction material, an interior material, an interior material for a car, a noise insulating material for an express highway wall and the like, a sound absorbing material, an adiobatic material, an article of furniture, a cushioning material, an absorbing material and filler for a drug and the like.

What is claimed is:

1. A chaff molding, formed from a composition comprising a chaff and a polyvinyl alcohol-based resin having a 1,2-diol structure as a side chain, wherein the polyvinyl alcohol-based resin having a 1,2-diol structure as a side chain is contained in an amount of 5 to 30 parts by weight relative to 100 parts by weight of the chaff, in the chaff molding, and the chaff comprises an unpulverized chaff.

2. The chaff molding according to claim 1, which is in a plate-shaped form.

3. The chaff molding according to claim 1, wherein the chaff further comprises a chaff pulverization product.

4. The chaff molding according to claim 3, wherein the chaff pulverization product in the chaff is contained in an amount of 5 to 95% by weight relative to a total weight of the chaff.

5. The chaff molding according to claim 1, which further comprises at least one inorganic salt.

6. The chaff molding according to claim 5, wherein the at least one inorganic salt is sodium sulfate.

7. The chaff molding according to claim 5, wherein the chaff molding consists essentially of the chaff, the polyvinyl alcohol-based resin having a 1,2-diol structure as a side chain, and the at least one inorganic salt.

8. The chaff molding according to claim 1, wherein the polyvinyl alcohol-based resin having a 1,2-diol structure as a side chain is a polyvinyl alcohol-based resin having a 1,2-diol structural unit represented by a following formula (1):

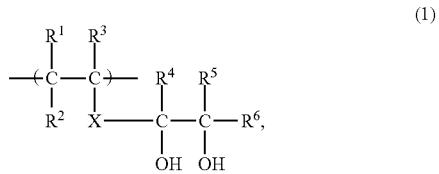

wherein $R^1$, $R^2$ and $R^3$ each independently represent a hydrogen atom or an organic group, X represents a single bond or a bond chain, and $R^4$, $R^5$ and $R^6$ each independently represent a hydrogen atom or an organic group.

9. The chaff molding according to claim 1, wherein the polyvinyl alcohol-based resin having a 1,2-diol structure as a side chain is a saponified product of a copolymer of a vinyl ester-based monomer with 3,4-diacyloxy-1-butene.

10. The chaff molding according to claim 1, wherein compressive strength of the chaff molding is 4 MPa or more.

11. The chaff molding according to claim 1, wherein an average sound absorption coefficient of the chaff molding at a frequency of from 2,000 to 5,000 Hz is 30% or more when a thickness of the chaff molding is 10 mm.

12. The chaff molding according to claim 1, wherein the chaff molding consists essentially of the chaff and the polyvinyl alcohol-based resin having a 1,2-diol structure as a side chain.

13. A method for producing a chaff molding, which comprises:
- gelling a water solution of a mixture of a chaff and a polyvinyl alcohol-based resin having a 1,2-diol structure as a side chain; and
- drying the gelled product,
- wherein the chaff molding is formed from a composition comprising a chaff and a polyvinyl alcohol-based resin having a 1,2-diol structure as a side chain, and
- the polyvinyl alcohol-based resin having a 1,2-diol structure as a side chain is contained in an amount of 5 to 30 parts by weight relative to 100 parts by weight of the chaff, in the chaff molding, and
- the chaff comprises an unpulverized chaff.

* * * * *